(12) United States Patent
Shioiri et al.

(10) Patent No.: US 11,149,801 B2
(45) Date of Patent: Oct. 19, 2021

(54) CLUTCH

(71) Applicant: TOYOTA JIDOSHA KABUSHIKI KAISHA, Aichi-ken (JP)

(72) Inventors: Hiroyuki Shioiri, Yokohama (JP); Taro Moteki, Ebina (JP); Yohko Yamashita, Shizuoka-ken (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/919,108

(22) Filed: Jul. 2, 2020

(65) Prior Publication Data

US 2021/0003179 A1 Jan. 7, 2021

(30) Foreign Application Priority Data

Jul. 5, 2019 (JP) .............................. JP2019-125890

(51) Int. Cl.
  *F16D 27/10* (2006.01)
  *F16D 121/20* (2012.01)
  *F16D 48/06* (2006.01)

(52) U.S. Cl.
  CPC .......... *F16D 27/10* (2013.01); *F16D 2121/20* (2013.01)

(58) Field of Classification Search
  CPC .... F16D 27/10; F16D 27/112; F16D 2121/20; F16D 13/46; F16D 2013/706; F16D 48/064; F16H 27/10; F16H 27/112; F16H 2121/20; F16H 2300/14
  USPC ........................................................ 192/84.1
  See application file for complete search history.

(56) References Cited

U.S. PATENT DOCUMENTS

| | | | | |
|---|---|---|---|---|
| 6,712,189 B2 * | 3/2004 | Hirt | ......................... | F16D 23/12 |
| | | | | 192/84.6 |
| 7,124,871 B2 * | 10/2006 | Friedmann | .............. | F16D 65/18 |
| | | | | 192/99 S |
| 8,991,579 B2 * | 3/2015 | Tanaka | .................... | F16D 21/00 |
| | | | | 192/48.8 |
| 9,644,690 B2 * | 5/2017 | Lee | ......................... | F16D 13/06 |
| 9,695,889 B2 * | 7/2017 | Ebuchi | .................... | B60K 6/445 |
| 9,816,568 B2 * | 11/2017 | Lee | ........................... | F16D 27/11 |
| 9,816,570 B2 * | 11/2017 | Ebuchi | .................... | F16D 11/14 |
| 2002/0144875 A1 * | 10/2002 | Dau | ........................ | F16D 13/583 |
| | | | | 192/48.8 |
| 2006/0052207 A1 * | 3/2006 | Teraoka | .................. | F16H 48/30 |
| | | | | 475/231 |
| 2015/0354643 A1 * | 12/2015 | Ebuchi | ..................... | B60K 6/38 |
| | | | | 192/69 |

(Continued)

FOREIGN PATENT DOCUMENTS

JP 2008248915 A 10/2008

*Primary Examiner* — Tinh Dang
(74) *Attorney, Agent, or Firm* — Hauptman Ham, LLP (57) ABSTRACT

A clutch includes: an input member and an output member that rotate about an axis; an actuator fixed so as to be nonrotatable, the actuator having a plunger, a case, and a coil housed in the case; and an elastic member having one end which is connected to the output member via a bearing and another end which is connected to the plunger directly or indirectly. Further, when the coil is energized and the plunger is attracted in a direction of the axis, the another end of the elastic member is biased in the direction of the axis, the elastic member is elastically deformed, and the output member is consequently pressed against and engaged with the input member.

5 Claims, 4 Drawing Sheets

(56) References Cited

U.S. PATENT DOCUMENTS

| | | | |
|---|---|---|---|
| 2016/0091034 A1* | 3/2016 | Lee | F16D 27/102 |
| | | | 192/35 |
| 2016/0131203 A1* | 5/2016 | Ebuchi | H01F 7/08 |
| | | | 192/84.92 |
| 2016/0238089 A1* | 8/2016 | Lee | F16D 15/00 |

* cited by examiner

CLUTCH

CROSS-REFERENCE TO RELATED APPLICATION(S)

The present application claims priority to and incorporates by reference the entire contents of Japanese Patent Application No. 2019-125890 filed in Japan on Jul. 5, 2019.

BACKGROUND

The present disclosure relates to a clutch.
Japanese Laid-open Patent Publication No. 2008-248915 discloses a clutch control device that controls engagement and disengagement of a clutch by an actuator.

SUMMARY

There is a need for providing a clutch capable of stably engaging and reducing a size of an actuator thereof.

According to an embodiment, a clutch includes: an input member and an output member that rotate about an axis; an actuator fixed so as to be nonrotatable, the actuator having a plunger, a case, and a coil housed in the case; and an elastic member having one end which is connected to the output member via a bearing and another end which is connected to the plunger directly or indirectly. Further, when the coil is energized and the plunger is attracted in a direction of the axis, the another end of the elastic member is biased in the direction of the axis, the elastic member is elastically deformed, and the output member is consequently pressed against and engaged with the input member.

DETAILED DESCRIPTION OF THE PREFERRED EMBODIMENTS

When the clutch in the related art disclosed in Japanese Laid-open Patent Publication No. 2008-248915 is mounted in, for example, a transmission for an electric car such as a plug-in hybrid vehicle (PHV) or an electric vehicle (EV), since a transmission for a normal electric car includes no high-pressure hydraulic power source, therefore, the shape and size (the diameter, the number of plates, etc.) of the friction member of the clutch may be increased.

In addition, in the case of a clutch using an elastic member, such as a diaphragm spring, instead of the friction member described above, the elastic member rotates together with the clutch, so that clutch thrust and actuator thrust are changed by the influence of centrifugal force (e.g., clutch thrust is decreased or required actuator thrust is increased by centrifugal force applied to the elastic member). Therefore, an engaging operation becomes unstable as compared with the case where the elastic member does not rotate. Furthermore, a design made so to overcome centrifugal force acting on the elastic member requires increasing the size of the actuator.

A clutch according to embodiments of the present disclosure will be described with reference to the accompanied drawings. Note that the present disclosure is not limited by the embodiments described below. In addition, compositional elements in the embodiments described below include those that can easily be replaced by those skilled in the art or those that are substantially the same.

First Embodiment

Figure 1:
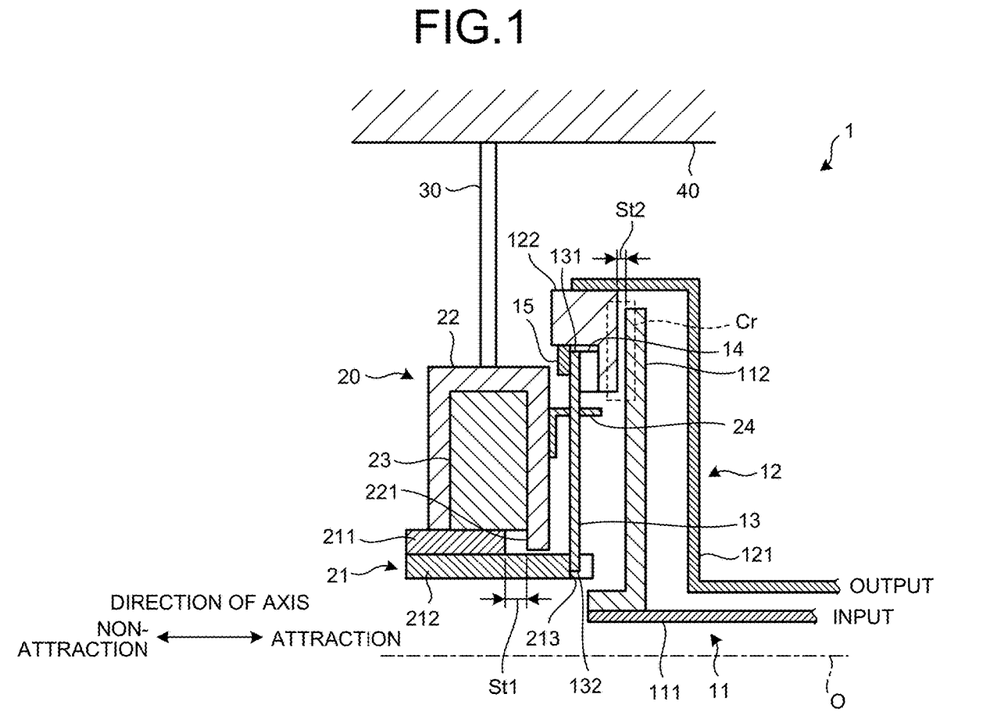
FIG. 1 is a view schematically illustrating a configuration of a clutch according to a first embodiment of the present disclosure and is a cross-sectional view illustrating a state before energization of a coil.

A clutch according to a first embodiment of the present disclosure will be described with reference to FIGS. 1 to 4. A clutch 1 is mounted in, for example, a transmission for an electric car such as a PHV or an EV and, as illustrated in FIG. 1, includes an input member 11, an output member 12, an elastic member 13, a bearing 14, a snap ring 15 and an actuator 20. Note that lubricating oil for lubrication is supplied to the inside of the clutch 1, particularly between the input member 11 and the output member 12.

The input member 11 is connected to the respective rotary shafts of an engine, a motor generator and the like (not illustrated). The input member 11 includes a main body 111 and a spline-fitted contact portion 112 on the leading-end side of the main body 111. The input member 11 is configured to be rotatable around the rotary shaft O.

The output member 12 is connected to an output shaft (not illustrated). The output member 12 includes a main body portion 121 and a contact portion 122 provided on the leading-end side of the main body portion 121 and configured to be slidable with the leading-end side. The output member 12 is configured to be rotatable around the axis of the rotary shaft O.

Figure 3:
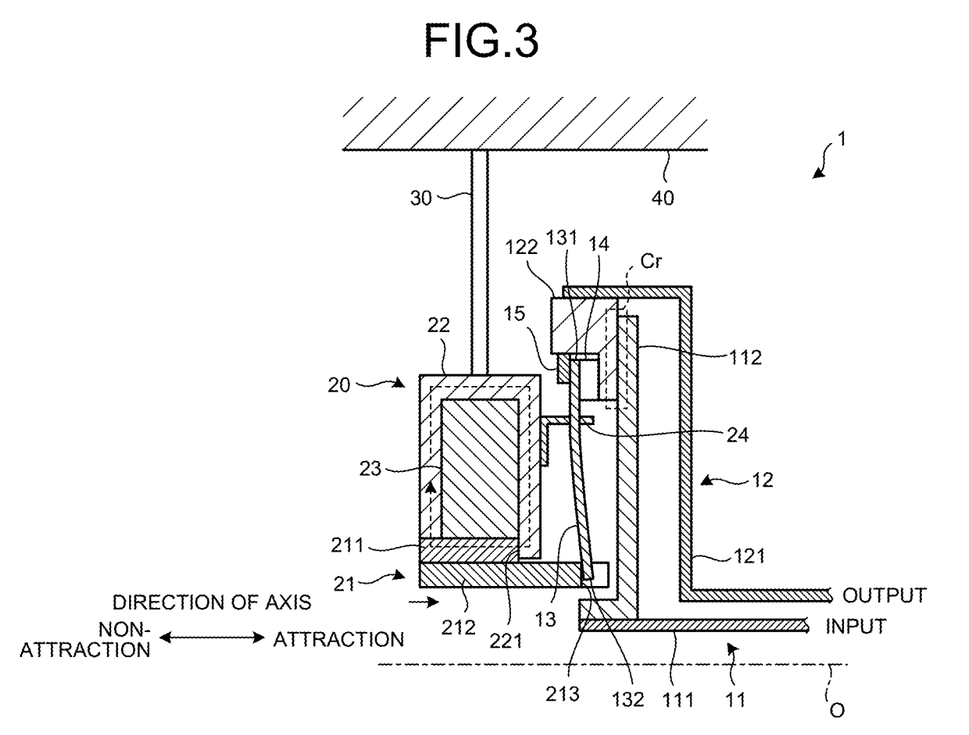
FIG. 3 is a view schematically illustrating a configuration of the clutch according to the first embodiment of the present disclosure and is a cross-sectional view illustrating a state after the energization of the coil.

In the clutch 1, the contact portion 122 of the output member 12 is moved in the direction of the axis by the actuator 20, which will be described below, and the contact portion 122 is brought into contact with, pressed against and, thereby, engaged with the contact portion 112 of the input member 11. FIG. 1 illustrates a disengaged state in which the clutch 1 is disengaged, and FIG. 3 illustrates an engaged state in which the clutch 1 is engaged. In the present embodiment, a region where the contact portion 112 and the contact portion 122 are in contact with each other when the clutch 1 is engaged is defined as a "clutch portion Cr".

The elastic member 13 is for transmitting the thrust of the actuator 20 (hereinafter, referred to as "actuator thrust") to the contact portion 122 of the output member 12. One end 131 of the elastic member 13 is connected to the contact portion 122 of the output member 12 via the bearing 14. The other end 132 of the elastic member 13 is directly or indirectly connected to the tip of a plunger 21 of the actuator 20. Specifically, the other end 132 of the elastic member 13 is in contact with a groove 213 formed in the tip of the plunger 21.

Note that the one-end side of the elastic member 13 is a position radially outside the elastic member 13 and indicates at least a portion opposite to and in contact with the bearing 14. In addition, the other-end side of the elastic member 13 is a position radially inside the elastic member 13 and indicates at least a portion opposite to and in contact with the groove 213 of the plunger 21.

Figure 2:
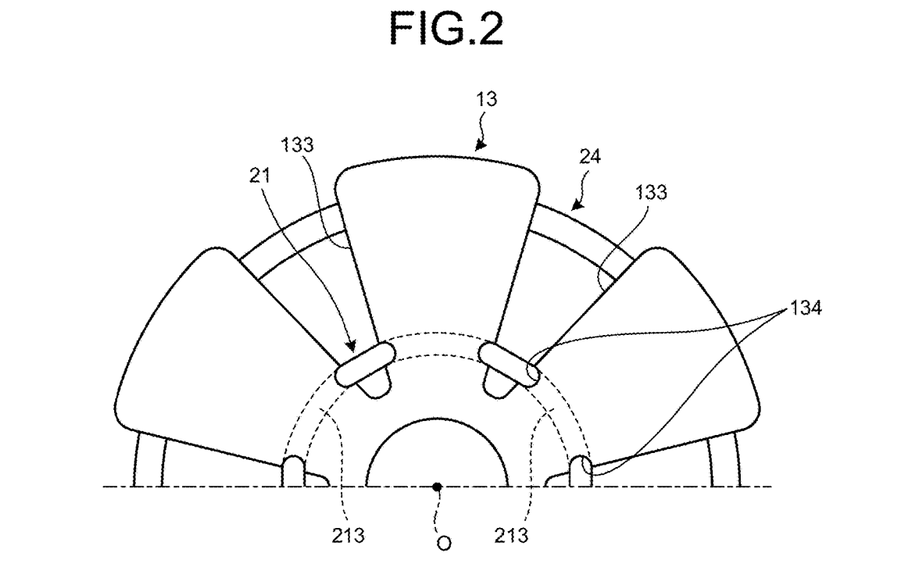
FIG. 2 is a front view schematically illustrating a configuration of an elastic member of the clutch according to the first embodiment of the present disclosure.

The elastic member 13 is composed of, for example, a diaphragm spring having a plate thickness of approximately 0.5 mm. As illustrated in FIG. 2, the elastic member 13 is formed in the shape of a disk having a hole in the center and has a plurality of notch portions 133 formed in a radial direction. FIG. 2 illustrates only the upper half of the elastic member 13.

A projecting member 24, which will be described below, is fitted in the radially outside parts of the notch portions 133. The tip of the plunger 21 is fitted in a groove 134 formed radially inside the notch portions 133. That is, the tip of the plunger 21 is fitted in the roots of the notch portions 133, and the projecting member 24 is fitted in parts near the notch openings of the notch portions 133. As described above, in the clutch 1, the tip of the plunger 21 and the projecting member 24 are fitted in the notch portions 133 of the elastic member 13, therefore, the actuator 20 and the elastic member 13 are fixed so to be nonrotatable relative to each other and consequently rotation of the elastic member 13 around the axis of the rotary shaft O is prevented.

As illustrated in FIG. 3, when a coil 23 of the actuator 20 is energized and the plunger 21 is attracted in the direction of the axis, the other end 132 of the elastic member 13 elastically deforms by its being moved in the direction of the attraction, that is, in the direction in which the other end is moved closer to the contact portion 112 of the input member 11. Then, the one end 131 of the elastic member 13 presses the contact portion 122 of the output member 12 against the contact portion 112 of the input member 11 via the bearing 14. Consequently, the clutch 1 is brought into an engaged state.

Meanwhile, as illustrated in FIG. 1, when the energization of the coil 23 ends, the other end 132 of the elastic member 13 is released from the elastic deformation by its being moved in the direction of non-attraction, that is, in the direction in which the other end is moved away from the contact portion 112 of the input member 11. Thereby, the plunger 21 is moved to its initial position, and the clutch 1 is disengaged. As described above, in the clutch 1, the plunger 21 is returned to the initial position by using the force of the elastic member 13 returning to its original shape when the coil 23 is de-energized, therefore, the need for a separate member such as a return spring is eliminated, making it possible to reduce the number of components and costs.

However, in the clutch 1, a return spring or the like (not illustrated) may be provided on the output member 12 such that the output member 12 is returned to its initial position by using this return spring or the like when forcing by the actuator 20 is released. In addition, in the clutch 1, a return spring or the like (not illustrated) may be provided between a case 22 and the plunger 21 such that the output member 12 is moved to the initial position by using this return spring or the like when forcing by the actuator 20 is released. With such a clutch 1, because the force of the elastic member 13 returning to the original shape can be used when the coil 23 is de-energized, a separate member like the return spring can be reduced in size, making it possible to reduce costs.

The bearing 14 is disposed between the contact portion 122 of the output member 12 and the one end 131 of the elastic member 13. The configuration of the bearing 14 is not particularly limited and may be a sliding bearing, such as a resin washer, or a rolling bearing. The snap ring 15 is formed in an annular shape and is fitted on the inner peripheral side of the contact portion 122. Thereby, the snap ring 15 functions as a stopper for the elastic member 13.

The actuator 20 is for switching the clutch 1 between an engaged state and a disengaged state. The actuator 20 is, for example, a direct-acting solenoid and is formed in a cylindrical shape as a whole. In addition, the actuator 20 is disposed at the inside-diameter side of the clutch portion Cr, which is a region where the contact portion 122 of the output member 12 and the contact portion 112 of the input member 11 are in contact with each other. Thus, by arranging the actuator 20 at the inside-diameter side of the clutch portion Cr, the radial dimension of the clutch 1 can be reduced.

The actuator 20 includes the plunger 21, the case 22, and the coil 23 housed in the case 22. The plunger 21 is formed in a cylindrical shape having a step on an outer peripheral surface thereof. A clearance of approximately several tens $\mu$m is defined between the plunger 21 and the coil 23.

When the coil 23 is de-energized, the plunger 21 is moved in the direction of the axis and in the direction in which the plunger is moved away from the contact portion 112 of the input member 11, as illustrated in FIG. 1. As a result, a predetermined clearance is defined between the plunger 21 and a stopper 221. Meanwhile, when the coil 23 is energized, the plunger 21 is moved in the direction of the axis and in the direction in which the plunger is moved closer to the contact portion 112 of the input member 11, as illustrated in FIG. 3. As a result, the plunger 21 is brought into close contact with the stopper 221.

Figure 4:
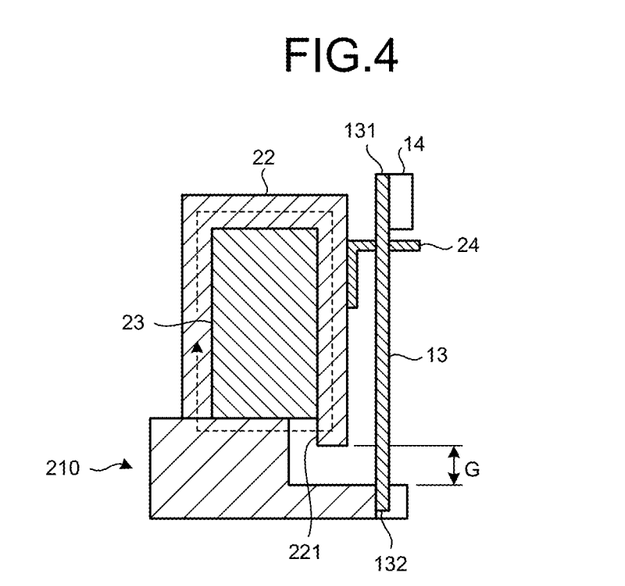
FIG. 4 is a cross-sectional view schematically illustrating an example of an actuator in which a plunger is formed of only a magnetic material.

The plunger 21 includes a magnetic material portion 211 made of a magnetic material and a non-magnetic material portion 212 made of a non-magnetic material. Here, for example, in the case of a plunger 210 formed of only a magnetic material, as illustrated in FIG. 4, it is necessary to provide a wide gap G between the tip of the plunger 210 and the stopper 221 in order to hinder leakage of a magnetic flux (see the broken-line arrow in FIG. 4) when the coil 23 is energized (when the plunger 21 is brought into close contact with the stopper 221). Therefore, the foregoing results in a problem in that the size of the actuator is increased.

Meanwhile, the need for a wide gap between the tip of the plunger 21 and the stopper 221 is eliminated by composing the plunger 21 out of the magnetic material portion 211 and the non-magnetic material portion 212, locating the magnetic material portion 211 close to the coil 23, and locating the non-magnetic material portion 212 away from the coil 23, as in the actuator 20 according to the present embodiment. Thus, the size of the actuator 20 can be reduced.

The groove 213 is formed in the tip of the plunger 21. This groove 213 is in contact with the other end 132 of the elastic member 13. The tip of the plunger 21 is fitted in the groove 134 of the elastic member 13.

The case 22 is formed in a cylindrical shape and is fixed via a fixing member 30 to a target fixing member 40 formed of, for example, a transmission case. Thus, the actuator 20 is fixed so as to be nonrotatable around the axis of the rotary shaft O.

The case 22 includes the stopper 221 in contact with the plunger 21. The projecting member 24 extending in the direction of the axis is provided on a side surface of the case 22. The projecting member 24 has a shape in which the outer peripheral side of a disk having a hole in the center is bent in the direction of the axis. In addition, the projecting member 24 is fitted in the notch portions 133 of the elastic member 13.

In the clutch 1 having a configuration as described above, the coil 23 is energized, the plunger 21 is attracted in the direction of the axis, thereby, the other end 132 of the elastic member 13 is biased in the direction of the attraction, and the elastic member 13 is elastically deformed. As a result, the contact portion 122 of the output member 12 is pressed against the contact portion 112 of the input member 11 and, thereby, the clutch 1 is engaged.

Note that the above-mentioned "biased" includes both the meaning of being pushed and the meaning of being pulled. The term "biased" in the clutch 1 according to the present embodiment means that the other end 132 of the elastic member 13 is pushed in the direction of attraction (see FIG. 3). Meanwhile, the term "biased" used for each of clutches 1A and 1B according to the second and third embodiments described below means that the other end 132 of and elastic member 13 is pulled in the direction of attraction (see FIG. 6).

In addition, in the clutch 1, because the elastic member 13 is connected to and integrated with the plunger 21 fixed so as to be nonrotatable, the elastic member 13 does not rotate around the axis of the rotary shaft O. Therefore, an actuator thrust according to an amount of actuation of the actuator 20 can always be generated. Consequently, designed clutch thrust can be generated without being affected by the rotational speeds of the input member 11 and the output member 12. In addition, because the clutch 1 can be designed without taking account of the influence of centrifugal force acting on the elastic member 13, the actuator 20 can be reduced in size.

Furthermore, in the clutch 1, for example, even if the stroke St2 of the clutch portion Cr varies to some extent due to the use of the elastic member 13, the variation can be absorbed by deformation of the elastic member 13. Therefore, when the coil 23 is de-energized, the plunger 21 can be held in the proximity of the stopper 221, and when the coil 23 is energized, the plunger 21 can be in close contact with the stopper 221.

In addition, the direct-acting solenoid that composes the actuator 20 has a characteristic in that the attraction force sharply increases when the solenoid is brought into close contact with the stopper 221. Therefore, in the case of the clutch 1 in which engaging force is generated by the plunger 21 held in the proximity of the stopper 221, the actuator 20 can be reduced in size, and an electrical current for generating the engaging force can be reduced.

In addition, in the clutch 1, the output member 12 is pressed against the input member 11 via the elastic member 13, making it easy to manage backlash in the direction of the axis in the transmission while securing required pressing force.

Second Embodiment

Figure 5:
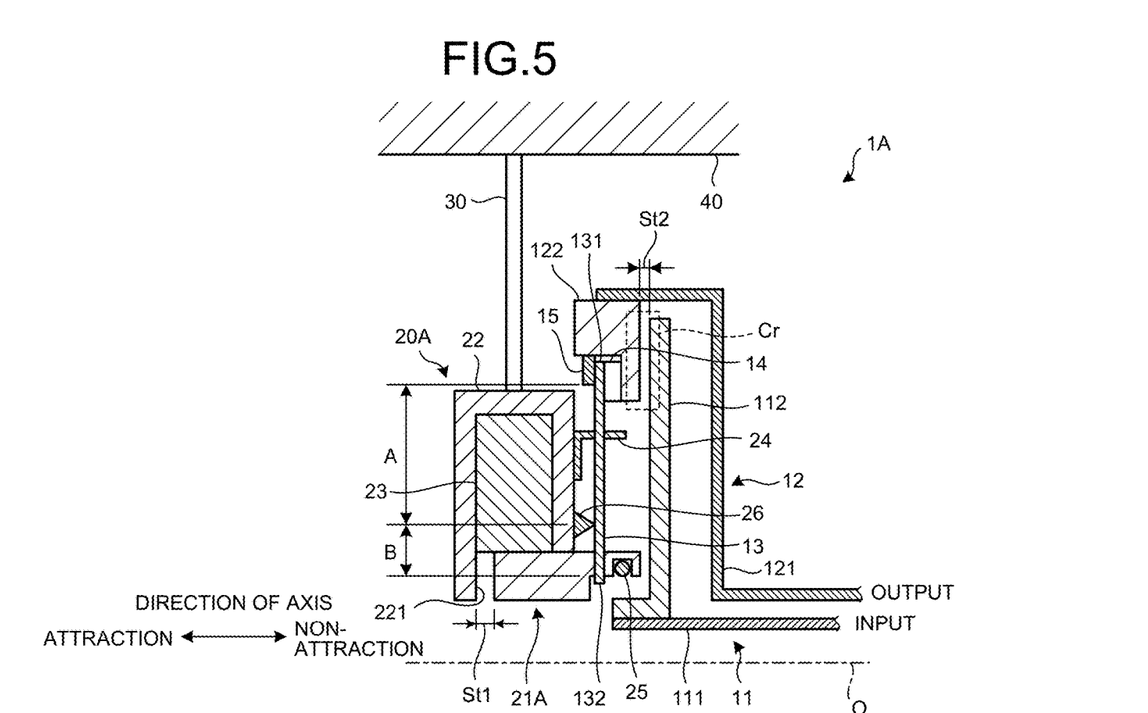
FIG. 5 is a view schematically illustrating a configuration of a clutch according to a second embodiment of the present disclosure and is a cross-sectional view illustrating a state before the energization of a coil.
Figure 6:
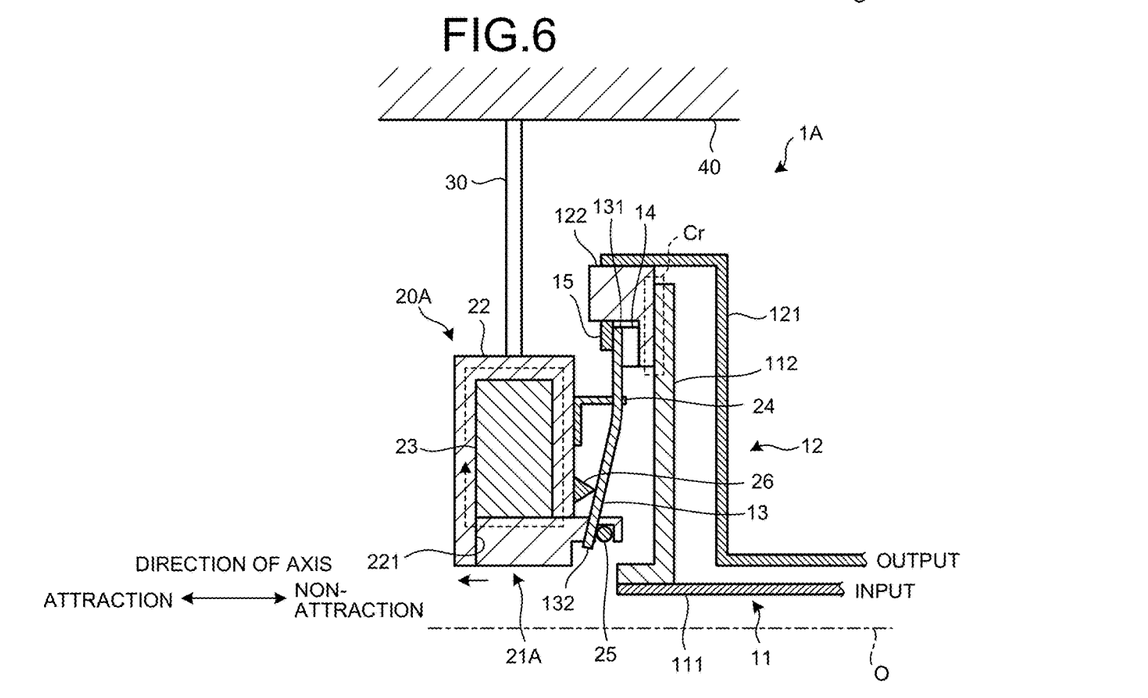
FIG. 6 is a view schematically illustrating a configuration of the clutch according to the second embodiment of the present disclosure and is a cross-sectional view illustrating a state after the energization of the coil.

A clutch 1A according to a second embodiment of the present disclosure will be described with reference to FIGS. 5 and 6. The configuration of the clutch 1A is the same as the configuration of the clutch 1, except an actuator 20A. The actuator 20A includes a plunger 21A, the case 22, and the coil 23.

The plunger 21A is formed in a cylindrical shape having a step on an inner peripheral surface thereof. When the coil 23 is de-energized, the plunger 21A is moved in the direction of the axis and in the direction in which the plunger is moved closer to the contact portion 112 of an input member 11, as illustrated in FIG. 5 As a result, a predetermined clearance is formed between the plunger 21A and a stopper 221. Meanwhile, when the coil 23 is energized, the plunger 21A is moved in the direction of the axis and in the direction in which the plunger is moved away from the contact portion 112 of the input member 11, as illustrated in FIG. 6. Thereby, the plunger 21A is brought into close contact with the stopper 221.

The plunger 21A is made of a magnetic material. A snap ring 25 for preventing an elastic member 13 from coming off is fitted into a groove formed in the tip of the plunger 21A.

On a side surface of the case 22, a protruding member 26 is provided, which is in contact with a part between the one end 131 and the other end 132 of an elastic member 13. The protruding member 26 is disposed radially inside the projecting member 24. The protruding member 26 has, for example, a triangular cross section, and the apex of the triangle is in contact with the elastic member 13. Thereby, when the coil 23 is energized, the elastic member 13 is elastically deformed with the protruding member 26 as a fulcrum (see FIG. 6).

The protruding member 26 is disposed between a clutch portion Cr and the plunger 21A and close to the plunger 21A. That is, the distance B between the plunger 21A and the protruding member 26 is set smaller than the distance A between the clutch portion Cr and the protruding member 26.

In the clutch 1A having the foregoing configuration, when the plunger 21A is attracted by energization of the coil 23, the elastic member 13 is elastically deformed with the protruding member 26 as a fulcrum, the contact portion 122 of the output member 12 connected to the one end 131 of the elastic member 13 is pressed against the contact portion 112 of the input member 11, and the clutch 1A is consequently engaged. By virtue of this, a stroke St2 on the clutch portion Cr side can be made long relative to a stroke St1 on the plunger 21A side. The stroke St1 on the plunger 21A side is, for example, approximately 1 mm to 1.5 mm, whereas the stroke St2 on the clutch portion Cr side is, for example, approximately 3 mm. Note that because FIG. 5 is a schematic diagram, the strokes St1, St2 illustrated here are different from the actual widths.

In addition, in the clutch 1A, when the coil 23 is de-energized, a large clearance for the clutch portion Cr can be secured, making it possible to reduce dragging as of shear resistance of lubricating oil flowing in the clutch 1A. Furthermore, because the stroke St1 on the plunger 21A side can be shortened, the size of the actuator 20A can be reduced.

In addition, in the clutch 1A, the stopper 221 is disposed opposite the stopper in the above-described clutch 1, thereby making it possible to eliminate a path through which a magnetic flux may leak when the coil 23 is energized (when the plunger 21A is brought into close contact with the stopper 221). Accordingly, a magnetic flux leakage can be eliminated. By virtue of this, the plunger 21A can be formed of only a magnetic material, making it possible to reduce the cost.

In the clutch 1A, a return spring (not illustrated) or the like may be provided for the output member 12 such that, when forcing by the actuator 20A is released, the output member 12 is returned to its initial position by using the return spring or the like and the plunger 21A is released from contact with the contact portion 112 of the input member 11. In the clutch 1A, a return spring or the like (not illustrated) may be provided between the case 22 and the plunger 21A such that, when forcing by the actuator 20A is released, the output member 12 is returned to its initial position by using the return spring or the like and the plunger 21A is released from contact with the contact portion 112 of the input member 11.

Third Embodiment

Figure 7:
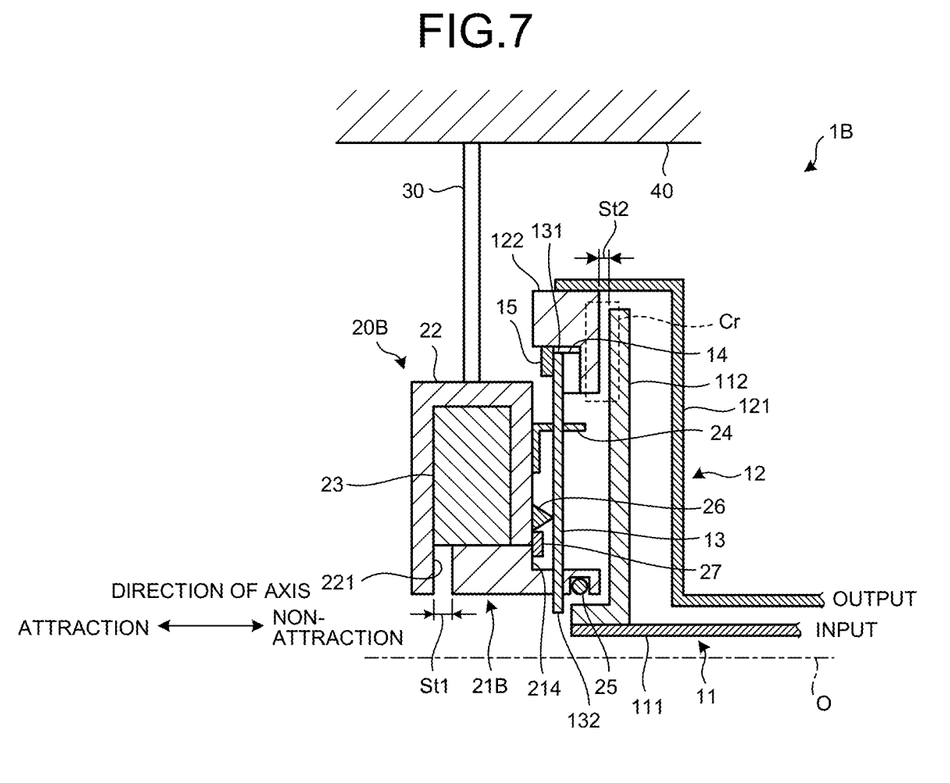
FIG. 7 is a view schematically illustrating a configuration of a clutch according to a third embodiment of the present disclosure and is a cross-sectional view illustrating a state before energization of a coil.

A clutch 1B according to a third embodiment of the present disclosure will be described with reference to FIG. 7. The configuration of the clutch 1B is the same as the configuration of the clutch 1 except an actuator 20B. The actuator 20B includes a plunger 21B, the case 22, and the coil 23.

The plunger 21B is formed in a cylindrical shape having a step on the outer peripheral surface. Similarly to the plunger 21A described above, the plunger 21B is moved away from the contact portion 112 of an input member 11 when the coil 23 is de-energized (see FIG. 7), and is moved closer to the contact portion 112 of the input member 11 when the coil 23 is energized. In addition, similarly to the plunger 21A described above, the plunger 21B is made of a magnetic material. Furthermore, the plunger 21B has a contact surface 214 along a radial direction of the clutch 1B orthogonal to the direction of the axis.

On a side surface of the case 22, a restricting member 27 is provided, which restricts movement of the plunger 21B in the direction of the axis by coming into contact with the aforementioned contact surface 214 when attraction of the plunger 21B is released (when the plunger is not attracted). This restricting member 27 is formed of a plate-like member, and is disposed radially inside a protruding member 26 and on the boundary between the case 22 and the plunger 21B.

With the clutch 1B having the foregoing configuration, the provision of the restricting member 27 that regulates movement of the plunger 21B in the direction of the axis can prevent falling of the plunger 21B after assembly. Thus, a clearance for a plunger 21B side and a clearance for a clutch portion Cr, when the coil 23 is de-energized, can be set in advance to respective values and, accordingly, the stability of operation of the actuator 20B can be improved. In addition, when the coil 23 is de-energized, a clearance for the clutch portion Cr can be secured widely as designed and, therefore, dragging as of shear resistance of lubricating oil can be reduced.

In the clutch according to the present disclosure, because the elastic member is connected and integrated with the plunger fixed so as to be nonrotatable, rotation of the elastic member around the axis is prevented, making it possible to always generate actuator thrust suitable for an amount of operation of the actuator. Therefore, designed clutch thrust can be generated without being affected by the rotational speeds of the input member and the output member. In addition, because the design can be made without considering the influence of centrifugal force acting on the elastic member, the actuator can be reduced in size.

In the clutch according to the present disclosure, when the coil is energized and the plunger is attracted in the direction of the axis, the other end of the elastic member is biased in the direction of the axis and consequently the elastic member is elastically deformed. Accordingly, the output member is pressed against the input member, thus engaging the clutch.

In the clutch according to the present disclosure, when the plunger is attracted by energization of the coil, the elastic member is elastically deformed with the protruding member as a fulcrum, and the output member connected to one end of the elastic member is pressed against and engaged with the input member. Therefore, a stroke on the clutch portion side can be made long relative to a stroke on the plunger side. In addition, when the coil is de-energized, a clearance for the clutch portion can be secured widely and, therefore, dragging as of shear resistance of lubricating oil can be reduced. Moreover, because the stroke on the plunger side can be shortened, the size of the actuator can be reduced.

In the clutch according to the present disclosure, the tip of the plunger and the projecting member are fitted in the notch portions of the elastic member, therefore, the actuator and the elastic member are fixed so as to be nonrotatable relative to each other and consequently rotation of the elastic member around the axis is prevented.

In the clutch according to the present disclosure includes the restricting member that restricts movement of the plunger in the direction of the axis. Thereby, a clearance for the plunger side and a clearance for a clutch portion, when the coil is de-energized, can be set to predetermined values and, accordingly, the stability of the operation of the actuator can be improved. Moreover, when the coil is de-energized, the clearance for the clutch portion can be secured widely as designed and, therefore, dragging as of shear resistance of lubricating oil can be reduced.

In the clutch according to the present disclosure, because the actuator is disposed on the inside-diameter side of the clutch, the radial dimension of the clutch can be reduced.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A clutch comprising:
   an input member and an output member that rotate about an axis;
   an actuator fixed so as to be nonrotatable, the actuator having a plunger, a case, and a coil housed in the case; and
   an elastic member having one end which is connected to the output member via a bearing and another end which is connected to the plunger directly or indirectly;
   wherein when the coil is energized and the plunger is attracted in a direction of the axis, the another end of the elastic member is biased in the direction of the axis, the elastic member is elastically deformed, and the output member is consequently pressed against and engaged with the input member.

2. The clutch according to claim 1,
   wherein a protruding member is provided on a side surface of the case, the protruding member being in contact with a part between the one end and the another end of the elastic member, and
   wherein when the coil is energized, the elastic member is elastically deformed with the protruding member as a fulcrum.

3. The clutch according to claim 2,
   wherein a projecting member extending in the direction of the axis is provided on a side surface of the case,
   wherein the elastic member is formed in a disk shape and has notch portions formed in a radial direction thereof, and
   wherein a tip of the plunger and the projecting member are fitted in the notch portion.

4. The clutch according to claim 3,
wherein the plunger has a contact surface along a direction orthogonal to the direction of the axis, and
wherein a restricting member is provided on a side surface of the case, the restricting member restricting movement of the plunger in the direction of the axis by coming into contact with the contact surface when attraction of the plunger is released.

5. The clutch according to claim 1,
wherein the actuator is disposed at an inside-diameter side of a clutch portion, which is a region where the output member and the input member are in contact with each other.

* * * * *